United States Patent
Wang et al.

(10) Patent No.: US 10,111,113 B2
(45) Date of Patent: Oct. 23, 2018

(54) COVERAGE ENHANCEMENT LEVEL DETERMINATION

(71) Applicant: QUALCOMM Incorporated, San Diego, CA (US)

(72) Inventors: Michael Mao Wang, San Diego, CA (US); Hao Xu, San Diego, CA (US); Peter Gaal, San Diego, CA (US); Wanshi Chen, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 15/180,297

(22) Filed: Jun. 13, 2016

(65) Prior Publication Data

US 2016/0373943 A1 Dec. 22, 2016

Related U.S. Application Data

(60) Provisional application No. 62/182,401, filed on Jun. 19, 2015.

(51) Int. Cl.
*H04W 4/00* (2018.01)
*H04W 24/02* (2009.01)
(Continued)

(52) U.S. Cl.
CPC ......... *H04W 24/02* (2013.01); *H04L 43/0829* (2013.01); *H04W 52/16* (2013.01); *H04W 52/20* (2013.01); *H04W 52/242* (2013.01)

(58) Field of Classification Search
CPC ........... H04W 74/0833; H04W 72/042; H04W 72/0446; H04W 24/02; H04W 48/12;
(Continued)

(56) References Cited

U.S. PATENT DOCUMENTS

2014/0098782 A1* 4/2014 Shirazi ............... H04J 13/0003
370/330
2015/0016312 A1 1/2015 Li et al.
(Continued)

FOREIGN PATENT DOCUMENTS

WO WO-2015012654 A1 1/2015
WO WO-2015065947 A1 5/2015

OTHER PUBLICATIONS

ISA/EP, International Search Report and Written Opinion of the International Searching Authority, Int'l App. No. PCT/US2016/037380, dated Aug. 19, 2016, European Patent Office, Rijswijk, NL, 12 pgs.

*Primary Examiner* — Mohamed Kamara
(74) *Attorney, Agent, or Firm* — Holland & Hart LLP

(57) ABSTRACT

A wireless device may determine a coverage enhancement (CE) level (or coverage extension) by attempting to decode a received broadcast signal. The wireless device may attempt to decode a portion of the broadcast signal using a CE level that is less than the CE level of the broadcast. If the decoding attempt is successfully, the CE level may be declared as an operating CE level. If decoding is unsuccessful, the CE level may be increased decoding retried. The wireless device may continue to test-decode the broadcast signal at new (e.g., increasing) CE levels until a CE level is sufficient for a decode and is declared the operating CE level of the wireless device. In some cases, the wireless device test-decodes a broadcast channel after selecting a CE level based on a path loss measurement of a downlink signal (e.g., reference signal).

26 Claims, 12 Drawing Sheets

(51) Int. Cl.
*H04L 12/26* (2006.01)
*H04W 52/16* (2009.01)
*H04W 52/20* (2009.01)
*H04W 52/24* (2009.01)

(58) Field of Classification Search
CPC ..... H04W 88/08; H04W 16/26; H04W 68/02; H04W 16/00; H04W 16/18; H04W 52/242; H04W 72/005; H04W 72/1278; H04W 36/165; H04W 52/02
See application file for complete search history.

(56) References Cited

U.S. PATENT DOCUMENTS

| | | | |
|---|---|---|---|
| 2016/0142981 A1* | 5/2016 | Yi | H04J 11/0069 455/522 |
| 2016/0157208 A1* | 6/2016 | Liang | H04W 72/005 455/458 |
| 2016/0353440 A1* | 12/2016 | Lee | H04W 4/005 |
| 2017/0105127 A1* | 4/2017 | Xiong | H04W 16/26 |
| 2017/0171764 A1* | 6/2017 | Dimou | H04W 24/02 |
| 2018/0092062 A1* | 3/2018 | Chen | H04W 4/70 |

* cited by examiner

COVERAGE ENHANCEMENT LEVEL DETERMINATION

CROSS REFERENCES

The present application for patent claims priority to U.S. Provisional Patent Application No. 62/182,401 by Wang, et al., entitled "Coverage Enhancement Level Determination," filed Jun. 19, 2015, assigned to the assignee hereof.

BACKGROUND

The following relates generally to wireless communication, and more specifically to coverage enhancement (CE) level determination for machine type communication (MTC) devices.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some wireless communications systems may employ CE techniques that increase system robustness. There may be different levels of coverage enhancement such that higher level coverage enhancement provide more reliable communications with respect to lower level coverage enhancements. But an erroneous CE level selection may result in transmission failures or increased battery consumption.

SUMMARY

The described features generally relate to methods, systems, and devices for coverage enhancement (CE) level determination by Machine Type Communication (MTC) devices. To mitigate erroneous CE level selection, for example, a wireless device (e.g., an MTC) may test-decode a broadcast signal using a particular CE level. Depending on whether the test-decode is successful, the wireless device may determine that the selected CE level is appropriate to support communication with other devices or a base station. In some cases, a device may select a minimum CE level, test-decode (e.g., decode a portion of) a broadcast channel, and then utilize the minimum CE level if the test-decode was successful, or select a different, higher CE level if the test decode was unsuccessful. The device may select the CE level before conducting other measurements; or, in some examples, the device measures a downlink signal path loss and then selects a CE level accordingly. In such cases, the device may use a broadcast signal test-decode to vary a selected CE level.

A method of wireless communication is described. The method may include receiving a broadcast signal, determining whether at least a portion of the broadcast signal was successfully decoded using a first CE level, and communicating according to the first CE level or a second CE level based at least in part on whether the broadcast signal was successfully decoded using the first CE level.

An apparatus for wireless communication is described. The apparatus may include means for receiving a broadcast signal, means for determining whether at least a portion of the broadcast signal was successfully decoded using a first CE level, and means for communicating according to the first CE level or a second CE level based at least in part on whether the broadcast signal was successfully decoded using the first CE level.

A further apparatus for wireless communication is described. The apparatus may include a processor, memory in electronic communication with the processor, and instructions stored in the memory and operable, when executed by the processor, to cause the apparatus to receive a broadcast signal, determine whether at least a portion of the broadcast signal was successfully decoded using a first CE level, and communicate according to the first CE level or a second CE level based at least in part on whether the broadcast signal was successfully decoded using the first CE level.

A non-transitory computer-readable medium storing code for wireless communication is described. The code may include instructions executable to receive a broadcast signal, determine whether at least a portion of the broadcast signal was successfully decoded using a first coverage enhancement CE level, and communicate according to the first CE level or a second CE level based at least in part on whether the broadcast signal was successfully decoded using the first CE level.

Some examples of the method, apparatuses, or non-transitory computer-readable medium described herein may further include processes, features, means, or instructions for determining that the broadcast signal was unsuccessfully decoded using the first CE level, and decoding at least the portion of the broadcast signal using the second CE level, wherein the second CE level comprises a greater coverage enhancement than the first CE level, and wherein the communication is according to the second CE level. Additionally or alternatively, some examples may include processes, features, means, or instructions for determining that the broadcast signal was successfully decoded using the first CE level, receiving a subsequent broadcast signal, and determining whether at least a portion of the subsequent broadcast signal was successfully decoded using the first CE level, wherein the communication according to the first or second CE level is based at least in part on whether the subsequent broadcast signal was successfully decoded using the first CE level.

Some examples of the method, apparatuses, or non-transitory computer-readable medium described herein may further include processes, features, means, or instructions for determining that a number of broadcast signals successfully decoded using the first CE level exceeds a threshold, and declaring the first CE level as an operating CE level, wherein the communication is according to the first CE level. Additionally or alternatively, in some examples communicating according to the first CE level or the second CE level comprises transmitting a random access channel (RACH) message on resources associated with the first CE level or the second CE level.

In some examples of the method, apparatuses, or non-transitory computer-readable medium described herein, determining whether at least a portion of the broadcast signal was successfully decoded using a first CE level comprises test-decoding the portion of the broadcast signal using the first CE level. Additionally or alternatively, some examples may include processes, features, means, or instructions for measuring a downlink signal path loss based at least in part on a reference signal received power (RSRP), and selecting the first CE level based at least in part on the measured path loss.

Some examples of the method, apparatuses, or non-transitory computer-readable medium described herein may further include processes, features, means, or instructions for determining that the broadcast signal was unsuccessfully decoded using the first CE level, and selecting the second CE level based at least in part on the determination that the broadcast signal was unsuccessfully decoded. Additionally or alternatively, in some examples the broadcast signal comprises a physical broadcast channel (PBCH).

In some examples of the method, apparatuses, or non-transitory computer-readable medium described herein, the first and second CE levels are selected from a set of CE levels, and wherein each CE level of the set corresponds to a different coverage enhancement value. Additionally or alternatively, in some examples the broadcast signal is transmitted according to a third CE level, and wherein the first CE level comprises a lesser coverage enhancement than the third CE level.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
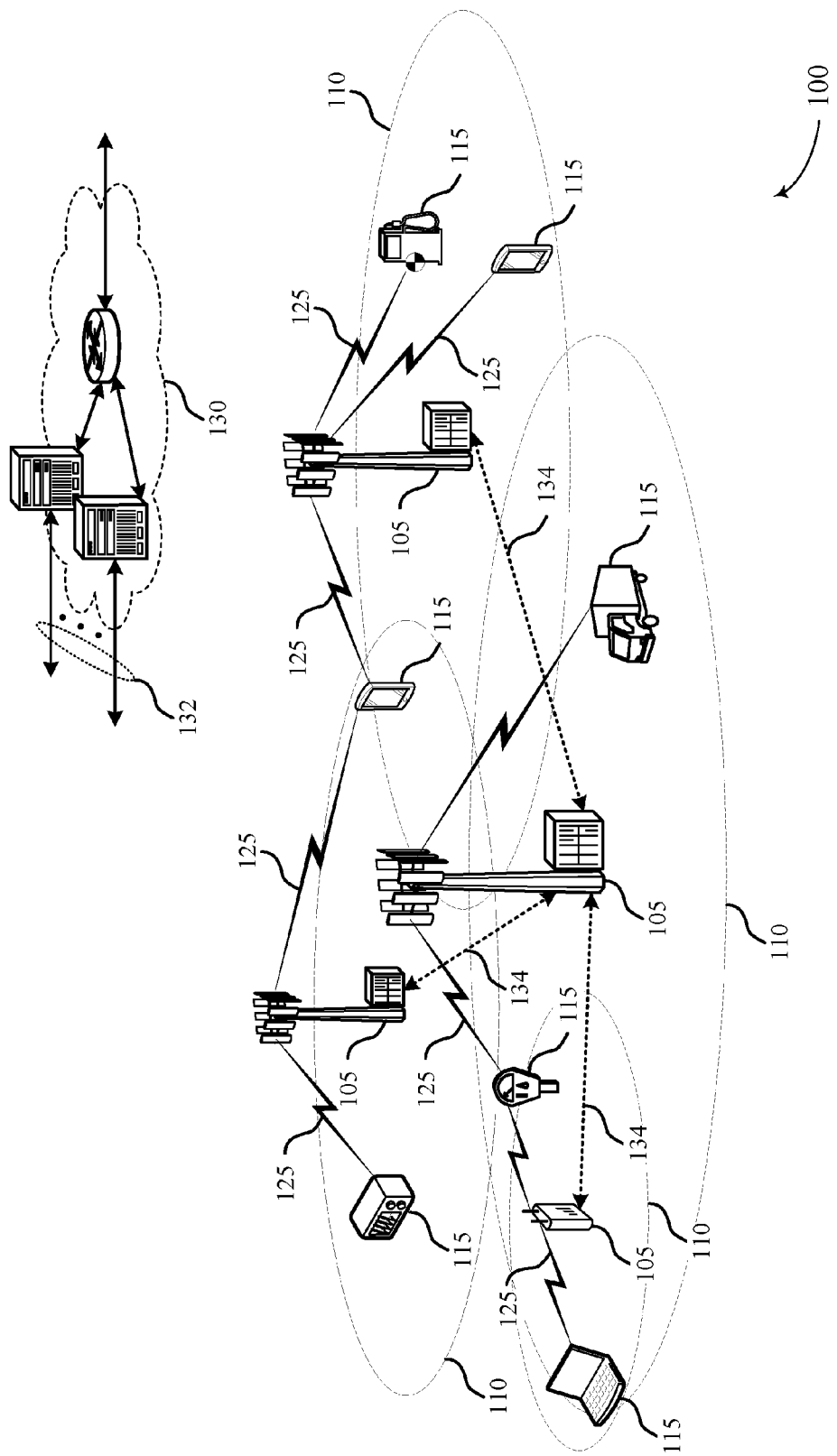
FIG. 1 illustrates an example of a wireless communications system that supports coverage enhancement (CE) level determination in accordance with various aspects of the present disclosure.

Accurate determination of a wireless device's (e.g., a Machine Type Communication (MTC) device) coverage enhancement (CE) need may increase system robustness and may increase longevity and performance of the wireless device. Coverage enhancement needs may be a function of or may be associated with a particular device's radio link conditions, which in turn may, as discussed below, be associated with the physical location of the device. A wireless system may implement CE techniques to improve the likelihood of successful communications with wireless devices. In some cases, a wireless system may support different CE levels (also referred to as coverage extensions), each of which may provide a different amount of CE. For instance, a system may support four CE levels—CE 0, CE 1, CE 2, and CE 3—each of which correspond to a different level of enhancement. The first CE level, CE 0, may correspond to no enhancement (e.g., 0 dB), while CE 3 may correspond to a considerable enhancement (e.g., 15 dB); and CE levels in between may correspond to various degrees of enhancement (e.g., 5 dB, 10 dB, etc.).

A wireless device may determine its CE need, and thus it may select a CE level, according to its associated radio link conditions. In some cases, the use of multiple CE levels may provide various categories for coping with coupling loss. Such variability in coping options may benefit a wireless system in terms of resource management of a wireless device in terms of battery life. But a device that selects an incorrect CE level (e.g., a device that inaccurately gauges its CE need) may subsequently undergo poor performance— e.g., it may not successfully communicate with other devices, base stations, or the like—and it may suffer from poor power management—e.g., the device may quickly drain its battery due to poorly calibrated settings. And the determination of a CE level is a non-trivial task, particularly for devices having a high CE need.

In some cases, a wireless device may determine a CE level by measuring a path loss using downlink signal strength. This process may, however, be time intensive and, in some instances, erroneous if additional verification procedures are not taken. Moreover, a device having a greater CE need may be more likely to arrive at erroneous results using this path-loss measurement method. By way of example, a UE that has a CE need or CE level of CE 3 may likely miscalculate its need (e.g., erroneously selecting CE 2, CE 1, or CE 0, as a CE level). The consequence of this type of erroneous determination may be a chain reaction of failed transmissions, which may result in excessive battery power consumption.

But a wireless device using an appropriate CE level (e.g., the lowest CE level sufficient for reliable communications) may conserve power by reducing transmit power levels, transmit repetitions, buffering, and the like. Additionally, appropriate CE level determination by a wireless device may reduce unnecessary communications between the wireless device and other devices or base stations, thus promoting efficient utilization of network resources.

In some cases, a wireless device, such as an MTC device, may correctly determine its CE level by test-decoding broadcast signals from a base station. For example, the wireless device may select a test CE level and attempt to decode (e.g., test-decode) a broadcast signal from the base station. Based on the result of the test-decoding, the wireless device may elect to change, or maintain, the CE level. The wireless device may implement an iterative process, for example, in which the CE level is increased for each decoding attempt following a failed test decode. The wireless device may thus select an operating CE level based on the test CE level that results in N consecutive successful test-decoding attempts. In some cases, a wireless device may initially determine or select a CE level using a path loss measurement, and the wireless device may verify the determination by test-decoding a broadcast signal with the initially selected CE level.

The following description further explains the above-discussed aspects and provides additional examples; the description is not, however, limiting of the scope, applicability, or examples set forth in the claims. Changes may be made in the function and arrangement of elements discussed without departing from the scope of the disclosure. Various examples may omit, substitute, or add various procedures or components as appropriate. For example, although the scenarios are described with respect to MTC devices, the techniques described herein may be used with a variety of other types of wireless communications devices and systems. In addition, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links. A UE 115 may be an MTC device, which may determine CE levels by test-decoding a broadcast signal received from a base station 105, for example.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a Third Generation Partnership Project (3GPP) term that can be used to describe a base station, a carrier or component carrier associated with a base station, or a coverage area (e.g., sector, etc.) of a carrier or base station, depending on context. The system 100, in some examples, may support various CE levels as specified by 3GPP.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels. As described herein, a UE 115 may determine a CE level by test decoding a broadcast signal, which may be transmitted at the PHY layer.

Data may therefore be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and UL shared channel (UL-SCH) for data. DL physical channels may include physical broadcast channel (PBCH) for broadcast information (e.g., a broadcast signal test-decoded by a UE 115 to determine or verify a CE level), physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, PUCCH for control data, and physical UL shared channel (PUSCH) for user data.

The UEs 115 may be dispersed throughout the wireless communications system 100, and each UE 115 may be stationary or mobile. As noted above, a UE 115 may be an MTC device, although the techniques described herein may be used in a variety of systems. A UE 115 may, for example, be a cellular phone, a personal digital assistant (PDA), a wireless modem, a wireless communication device, a handheld device, a tablet computer, a laptop computer, a cordless phone, a wireless local loop (WLL) station, or the like. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers, although MTC UEs 115 under CE may operate on a single carrier, which may be used to support other, non-MTC UEs 115.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). For instance, a TTI (e.g., 1 ms in LTE, the equivalent of one subframe) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to look for its DL data. In other cases, a TTI may be shorter than a subframe or may be dynamically selected (e.g., in short TTI bursts or in selected component carriers using short TTIs).

As mentioned above, wireless communications system 100 may provide for automated communication such as MTC or M2M communication. For example, an MTC UE 115 may be a device that integrates sensors or meters to measure or capture information and relay that information to a central server or application program that can make use of the information or present the information to humans interacting with the program or application. Examples of applications for MTC UEs 115 include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some examples, an MTC UE 115 may be located deep inside a building (e.g., a basement), which may significantly and negatively affect its radio link and, in turn, may require a high level of CE.

MTC UEs 115 may be configured to enter a power saving "deep sleep" mode when not engaging in active communications. In some cases, MTC UEs 115 may be configured for regular transmission intervals that alternate with sleep intervals. An MTC UE 115 operating with an appropriate CE level may effectively communicate using sleep intervals (e.g., discontinuous reception (DRX)). That is, effective communication with a proper CE level may avoid missed transmissions, which may avoid a base station 105 interpreting a missed transmission as a sleep interval, for example.

In some cases, MTC UEs 115 may have limited capabilities. For example, while some MTC devices may have broadband capacity, other MTC UEs 115 may be limited to narrowband communications. This narrowband limitation may, for example, interfere with the ability of an MTC UE 115 to receive control channel information or transmitted reference signals using the full bandwidth served by a base station. In some wireless communication systems, such as those employing LTE techniques, an MTC UE 115 having limited bandwidth capability (or another device with similar capabilities) may be referred to as a category 0 device. In some instances, certain narrowband frequencies may be associated with certain CE levels, and an MTC UE 115 may select a narrowband with which to communicate based on a determined CE level.

In certain examples, MTC UEs 115 may have reduced peak data rates (e.g., a maximum transport block size may be 1000 bits). Additionally, an MTC UE 115 may have rank one transmission and one antenna for receiving. This may limit an MTC UE 115 to half-duplex communication (i.e., the device may not be capable of simultaneously transmitting and receiving). If an MTC UE 115 is half-duplex, it may have relaxed switching time (e.g., from transmission (Tx) to reception (Rx) or vice versa). For example, a nominal switching time for a non-MTC UE 115 may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC UE 115 may support 1.4 MHz bandwidth (i.e., 6 resource blocks in an LTE system). In some instances, CE of such MTC devices may be employed to provide more reliable communications. Coverage enhancements may include, for example, power boosting (e.g., of up to 15 dB), beam-forming, and bundling of transmit time intervals (TTIs) to provide redundant versions of a transmission.

Wireless communications system 100 may, for example, employ TTI bundling to improve a communication link 125 in relatively poor radio conditions or in deployments where MTC UEs 115 may operate using a relatively narrow bandwidth or are in a coverage limited location, such as a basement. TTI bundling may involve sending multiple redundant copies of the same information in a group of consecutive or non-consecutive TTIs rather than waiting for feedback indicating data was not received before retransmitting redundancy versions. For instance, various physical channels—including the PBCH and associated messages—may be associated with multiple redundant transmissions to a wireless communications device. In some cases, the number of redundant versions can be on the order of tens of subframes, and different channels may have different redundancy levels.

In addition to, or in lieu of, TTI bundling, wireless communications system 100 may employ power boosting for CE. Power-boosted signals may be signals which are communicated at higher power levels with respect to nominal signals. In some cases, different levels of power-boosting or different redundancy levels of TTI bundling may be associated with different levels of CE. That is, different combinations of TTI bundling and power boosting may result in different levels of reliability, which may be categorized as CE levels. In some cases, the reliability or robustness of a CE level may be measured or referred to in terms of decibels (dB). Thus, as mentioned above, there may be distinct CE levels that correspond to discrete levels of gain (dBs).

By way of example, four CE levels may be employed. A first CE level (e.g., CE 0) may, for instance, provide 0 dB gain, a second CE level (e.g., CE 1) may provide 5 dB gain, a third CE level (e.g., CE 2) may provide 10 dB gain, and a fourth CE level (e.g., CE 3), may provide 15 dB gain. Thus, higher levels of CE may provide greater reliability or may tend to ensure coverage more than lower levels; however, the increases in coverage may also require additional resources (e.g., battery power) to support such gains. Coverage enhancements may also be referred to herein as coverage extensions or coverage enhancement extensions. Although described with reference to four CE levels, wireless communications system 100 may support various levels of CEs, each of which may be achieved via the techniques described herein.

According to the present disclosure, a wireless device, such as a UE 115, may determine an appropriate CE level corresponding to its communication conditions and capabilities. For example, the UE may select a high CE level for poor communication conditions. In other words, a UE may select a CE level that overcomes poor communication conditions (e.g., significant penetration loss) and provides a high likelihood of successful communication. The CE level may be determined by the results of test-decoding attempts on received broadcast signals. In some cases, the test-decoding attempts may be performed at a CE level that is lower than the CE level with which the broadcast signal was transmitted. The UE 115 may select its operating CE level as the CE level that results in N (i.e., some threshold number) of successful decoding attempts of the broadcast signal. Although coverage enhancement techniques—including redundant transmissions and power boosting—may be employed with MTC UEs 115, other types of UEs may likewise utilize or benefit from such techniques.

Figure 2:
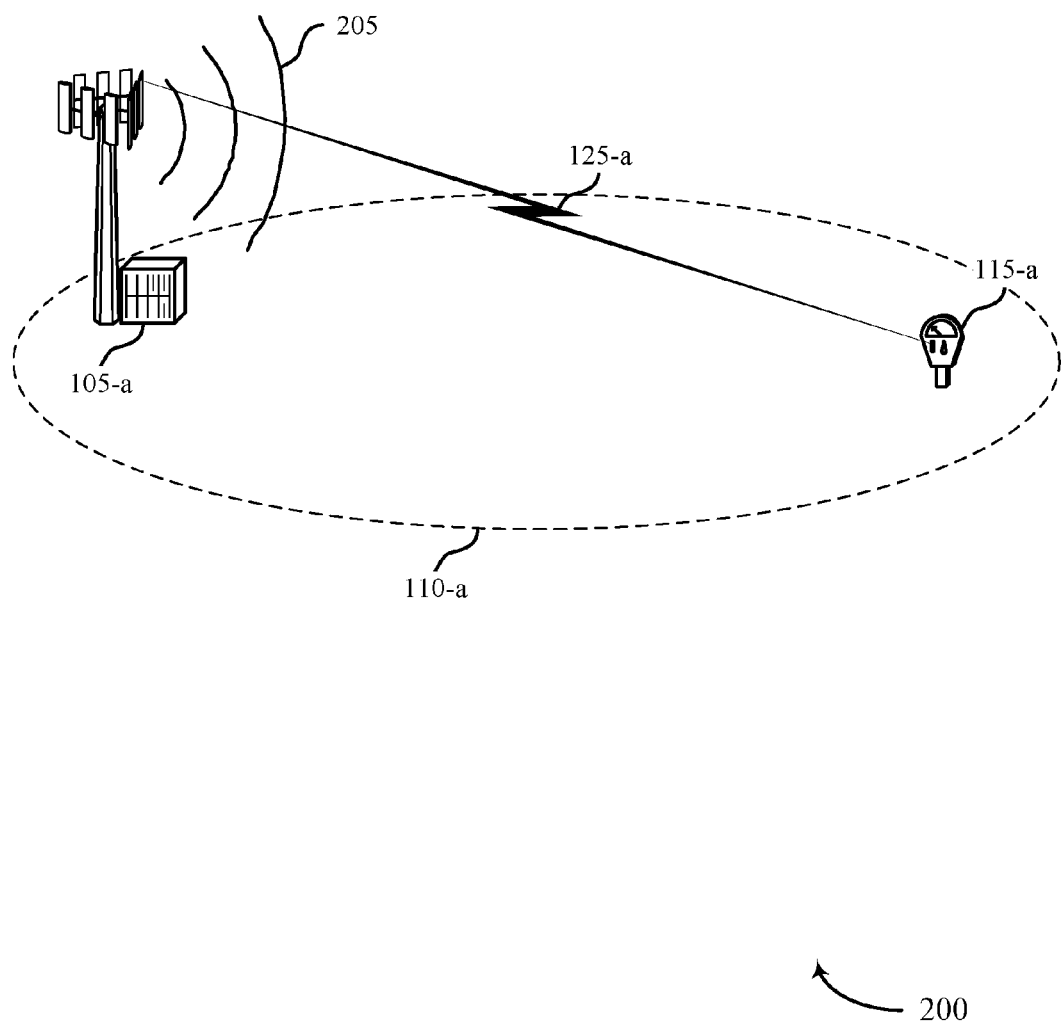
FIG. 2 illustrates an example of a wireless communications system that supports CE level determination in accordance with various aspects of the present disclosure.

FIG. 2 illustrates an example of a wireless communications system 200 that supports CE level determination, in accordance with various aspects of the present disclosure. Wireless communications system 200 may include a UE 115-a, which may be an example of a UE 115 described with reference to FIG. 1. For example, as illustrated, the UE 115-a may be an MTC UE 115 (e.g., a meter). Wireless communications system 200 may also include a base station 105-a, which may be an example of a base station 105 described above with reference to FIG. 1. The base station 105-a may transmit control and data to any UE 115 within its geographic coverage area 110-a via a communication link 125-a. For example, communication link 125-a may allow for bidirectional communication between the UE 115-a and the base station 105-a.

Wireless communications system 200, as mentioned above, may provide the UE 115-a access to the network. However, prior to establishing communication link 125-a the UE 115-a may perform time and frequency synchronization. For example the UE 115-a may leverage synchronization signals broadcast from the base station 105-a (e.g., a primary synchronization signal (PSS) and a secondary synchronization signal (SSS)) to initiate system synchronization. Once the PSS and SSS have been acquired, UE 115-a may determine the cell identity associated with base station 105-a and complete initial cell synchronization. Additionally, the UE 115-a may receive a master information block (MIB) on PBCH. The MIB may convey information that enables the UE 115-a to access system information from system information blocks (SIBs) (e.g., SIB1 and SIB2). Utilizing this information, the UE 115-a may complete the initial access procedure and establish communication link 125-a.

Wireless communications system 200 may include UEs 115 with different capabilities and different communication environments. For example, the UE 115-a may be located relatively far from the base station 105-a and may have different radio capacity than other devices; accordingly, the UE 115-a may use a CE level that differs from a CE level that would be needed if the UE 115-a were located relatively close to the base station 105-a or in a different environment (e.g., in the open rather than in a building). Thus, a UE 115 may select a CE level based on the communication conditions associated with its environment (e.g., distance from a serving base station 105, noise, interference, penetration loss, etc.). In one example, the UE 115-a may be located in the basement of a building such that signals from base station experience negative effects during propagation (e.g., attenuation, noise, interference, etc.). Accordingly, the UE 115-a may utilize a relatively high—as compared with other UEs 115—CE level (e.g., CE 3) to mitigate such deleterious effects (e.g., via power boosting or TTI bundling).

In some cases the UE 115-a may be unaware of which CE level is appropriate for the conditions—e.g., the UE 115-a may be unaware of a CE level sufficient to overcome the conditions, or the UE 115-a may be performing an initial cell access. In such cases, the UE 115-a may perform a procedure to determine a CE level at which to operate. In certain cases, the UE 115-a may measure the signal strength of downlink references signals (e.g., cell-specific reference signal (CRS)) to determine the path loss between the UE 115-a and the base station 105-a. The UE 115-a may, for instance, measure the downlink signal path loss based on a reference signal received power (RSRP). Based on the path loss, the UE 115-a may select an appropriate CE level. An appropriate CE level may be the lowest CE level that enables successful transmissions. For example, a UE 115 may select a CE level that is sufficient to overcome the conditions while incurring the minimal cost (e.g., processing or power costs). In certain cases, (e.g., when penetration loss is significant), a downlink signal make be so distorted that a UE may make erroneous measurements of the signal. For example, a CE 3 UE 115 (e.g., a UE having a CE need requiring the enhancement achieved by CE 3) may be determined as a CE 2, CE 1, or CE 0 UE 115. Misidentifying a CE level may, as mentioned above, result in a chain reaction of failed transmissions and excessive power consumption. Thus, the UE 115-a may have alternative ways of determining or verifying a CE level.

For example, the UE 115-a may leverage information gained from monitoring a broadcast signal 205 (e.g., a PBCH, such as the MIB) to determine the CE level. In some cases, the UE 115-a selects an initial CE level to test-decode a portion of the broadcast signal 205. The UE 115-a may elect to test-decode the broadcast signal 205 at a CE level that is lower than the CE level applied to the broadcast signal 205 by the base station 105-a. For example, the base station 105-a may transmit the broadcast signal 205 using a TTI bundling scheme associated with the highest level of coverage enhancement (e.g., CE 3). But in such cases, the UE 115-a may—instead of waiting for an accumulation of redundant versions of the broadcast signal 205 to achieve the intended CE 3 gain (e.g., 15 dB)—attempt to decode the broadcast signal 205 at a lower CE level (e.g., a test CE level of CE 0). If the decoding is successful, the UE 115-a may perform a verification procedure. For example, the UE 115-a may verify that the test CE level is sufficient by decoding a new broadcast signal using the test CE level. Once a threshold number of new broadcast signals 205 have been successfully decoded using the same test CE level, the UE 115-a may declare the test CE level as the operating CE level of the UE 115-a. In other words, the UE 115-a may declare the test CE level as its operating enhancement level after determining that the number of successful decoding attempts has exceeded a threshold.

On the other hand, if the first test-decoding is unsuccessful, the UE 115-a may increase, or increment, the test CE level (e.g., to CE 1) and re-attempt to decode the broadcast signal 205 using the new test CE level. That is, the UE 115-a may refrain from decoding the broadcast signal 205 until the broadcast signal 205 has achieved the gain corresponding to the test CE level (e.g., 5 dB). The UE 115-a may continue to test-decode the broadcast signal at new CE levels until a decoding succeeds. After a successful test-decoding, the UE 115-a may implement a verification process such as that described above. In some cases, once the operating CE level of the UE 115-a has been determined, the UE 115-a may select random access resources (e.g., physical random access channel (PRACH) resources) based on the selected CE level. The random access resources may indicate to the base station 105-a the coverage needs associated with the UE 115-a.

In certain scenarios, the UE 115-a may attempt to decode the broadcast signal 205 on the fly; that is, the UE 115-a may test-decode the broadcast signal at each CE level as soon as enough versions (i.e., repetitions) of the signal have been received to reach the gain associated with each respective CE level. For example, the UE 115-a may attempt to test-decode the broadcast signal 205 after the broadcast signal 205 has achieved the lowest CE level (e.g., CE 0) but before it has achieved the next highest CE level (e.g., CE 1). If the test-decode fails, the UE 115-a may wait until the broadcast signal 205 has reached the next highest CE level before re-attempting the decode the broadcast signal 205.

In other cases, the UE 115-*a* may attempt to test-decode the broadcast signal 205 off-line. For instance, the UE 115-*a* may buffer enough received versions to reach the highest level of coverage enhancement (e.g., CE 3) before attempting to decode at a lower CE level (e.g., CE 0). For example, after the full number of versions corresponding to highest CE level (e.g., CE 3) has been buffered, the UE 115-*a* may select and combine a number of versions associated with the lowest CE level (e.g., CE 0). That is, the UE 115-*b* may select a portion of the buffered versions to combine and test-decode. If the test-decoding of the redundancy-version broadcast signal 205 fails, the UE 115-*a* may select and combine additional versions from the buffer until the next highest CE level is reached (e.g., CE 1). This process may be repeated at different CE levels until the broadcast signal has been successfully decoded.

Figure 3:
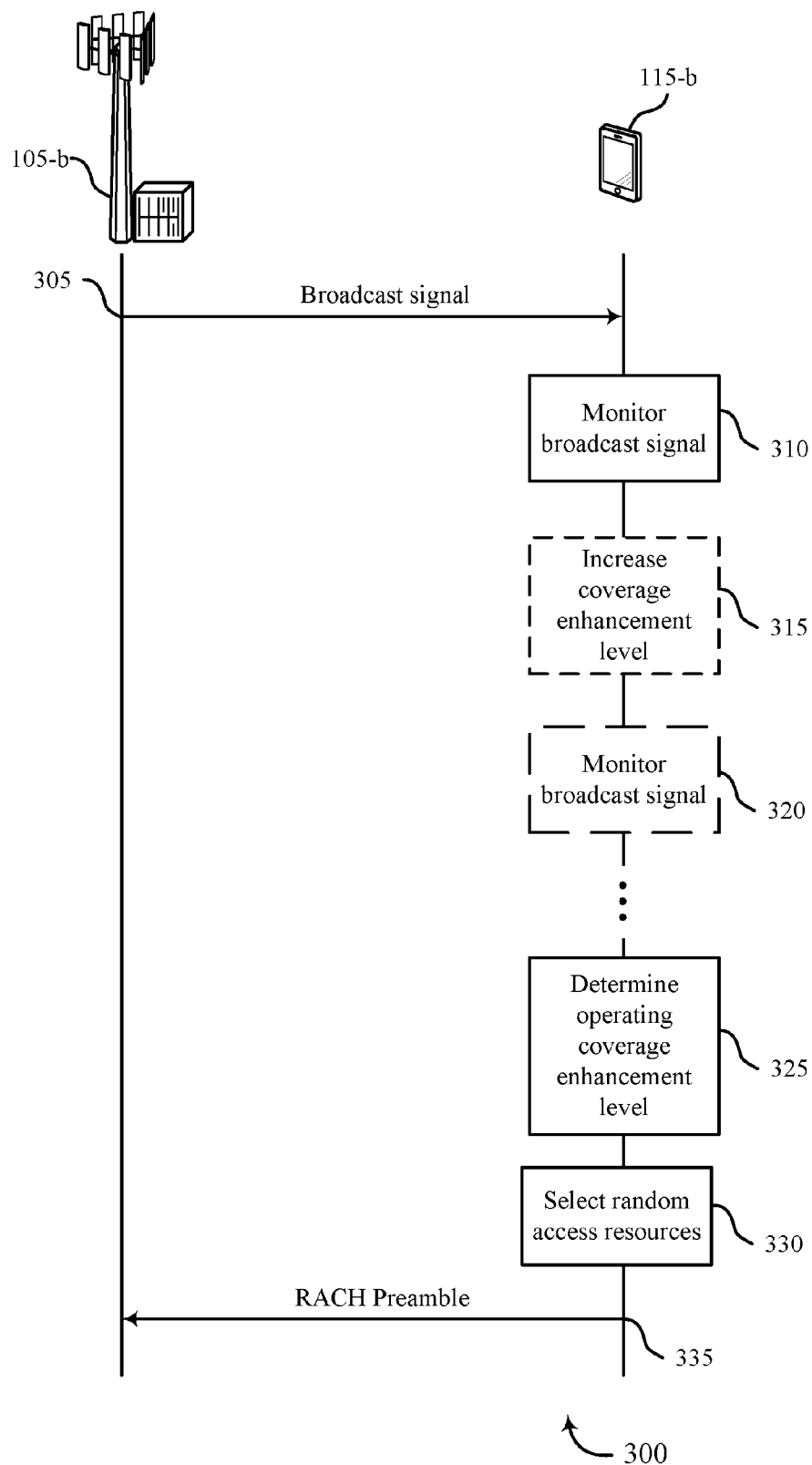
FIG. 3 illustrates an example of a process flow for a system that supports CE level determination in accordance with various aspects of the present disclosure.

FIG. 3 is an example of a process flow diagram 300 for a system that supports CE level determination in accordance with various aspects of the present disclosure. The diagram 300 may illustrate CE determination techniques employed within the systems 100 or 200 of FIG. 1 or 2. The diagram 300 includes a UE 115-*b* and a base station 105-*b*, which may be examples of a UE 115 and base station 105 of FIG. 1 or 2. The UE 115-*b* may be an MTC UE 115; and the UE 115-*b* and the base station 105-*b* may be employing CE techniques. In some cases, the diagram 300 may be an example of aspects of random access procedures. For example, the diagram 300 may illustrate processes that are employed after the UE 115-*b* has acquired the PSS and SSS.

At 305, the base station 105-*b* may send, and the UE 115-*b* may receive, a broadcast signal. The broadcast signal may be transmitted with a high level of coverage enhancement (e.g., CE 3). In some cases, the broadcast signal includes the MIB, which is conveyed using PBCH. At 310, the UE 115-*b* may monitor the broadcast signal. In some examples, monitoring the broadcast signal may include test-decoding the broadcast signal at a test CE level (e.g., CE 0) that is less than the CE level supported by the signal (e.g., CE 3). That is, the UE 115-*b* may attempt to decode the broadcast signal before the gain of the signal has reached full potential (e.g., 15 dB). In some cases, the UE 115-*b* may attempt to partially decode the signal. For example, the UE 115-*b* may attempt to decode only a portion of the signal. Additionally or alternatively, the UE 115-*b* may attempt to decode the signal before the highest CE level has been attained. If the decode attempt is successful, the UE 115-*b* may proceed to 325 and determine the operating CE level. For example, the UE 115-*b* may select the test decode CE level to be the actual operating CE level of the UE 115-*b*.

If the decode attempt at 310 is unsuccessful, the UE 115-*b* may proceed to 315 and increase the test CE level (e.g., the test CE level may be incremented to CE 1). Subsequently, at 320, the UE 115-*b* may monitor the broadcast signal according to the new test CE level (e.g., CE 1). For instance, the UE 115-*b* may wait until a gain of 5 dB is reached before attempting to decode the broadcast signal. If the decoding is unsuccessful, the UE 115-*b* may continue to increase the test CE level for each subsequent test-decoding of the broadcast signal until a decoding is successful. Once a decoding is successful, the UE 115-*b* may proceed to 325 and select the test CE level that resulted in the successful decoding as its operating CE level. Thus, the UE 115-*b* may determine its CE level based on broadcast signal monitoring.

In certain scenarios, the UE 115-*b* may verify the test CE level before declaring it as the operating CE level. For example, the UE 115-*b* may receive subsequent broadcast signals and attempt to decode each broadcast signal using the test CE level. The UE 115-*b* may continue to decode subsequent broadcast signals until the number of successful decoding attempts has satisfied a threshold. Once N decoding attempts have been successful, the UE 115-*b* may declare the test CE level and the operating CE level of the UE 115-*b*. In some cases, declaring the operating CE level may include communicating using the operating CE level. In this or other examples, declaring the operational CE level may include sending an indication of the operating CE level to the base station 105-*b*.

At 330, the UE 115-*b* may select random access resources for communication with the base station 105-*b*. In one example, the random access resources may be PRACH resources for conveying the random access preamble. There may be a number of resources (e.g., narrowband resources) available for random access use; however, some resources may be associated with certain levels of coverage enhancements. Accordingly, the UE 115-*b* may select resources for a random access procedure that correspond to the CE level selected at 325. At 335, the UE 115-*b* may transmit, and the base station 105-*b* may receive, a RACH preamble conveyed by the resources selected at 330. The UE 115-*b* may apply the determined CE level to the transmission. The resources used to carry the RACH preamble may intrinsically indicate the CE level of the UE 115-*b*. Thus, the base station 105-*b* may determine the CE level of the UE 115-*b* based on the frequencies used to convey the RACH preamble.

Figure 4:
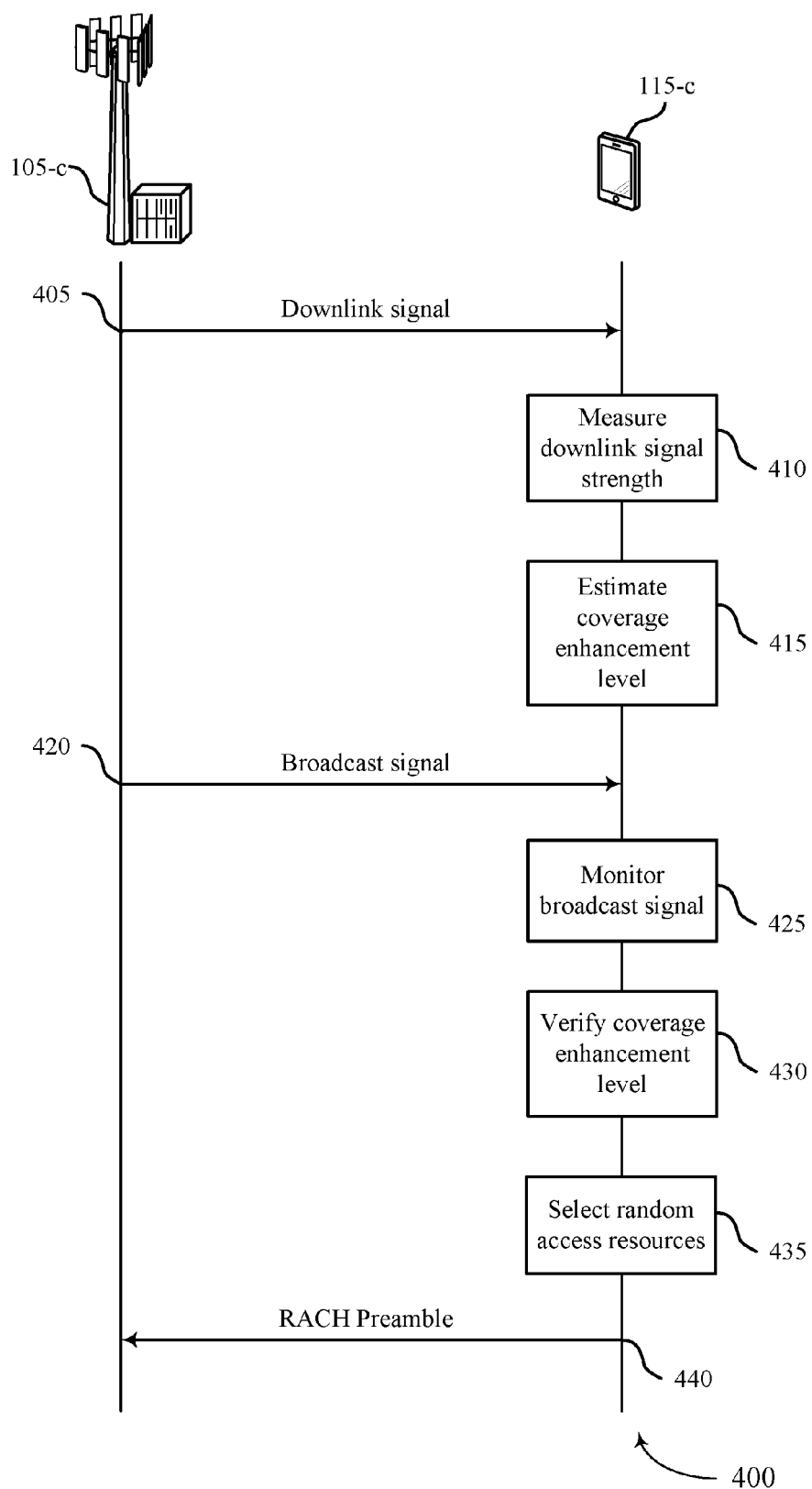
FIG. 4 illustrates an example of a process flow for a system that supports CE level determination in accordance with various aspects of the present disclosure.

FIG. 4 illustrates an example of a process flow diagram 400 for a system that supports CE level determination in accordance with various aspects of the present disclosure. The diagram 400 may illustrate aspects of initial random access techniques employed within the systems 100 or 200 of FIG. 1 or 2. The diagram 400 includes a UE 115-*c* and a base station 105-*c*, which may be examples of a UE 115 and base station 105 of FIG. 1 or 2. The UE 115-*c* may be an MTC UE 115; and the UE 115-*c* and the base station 105-*c* may be employing CE techniques. The diagram 400 may be an example of random access procedures, such as a situation in which the UE 115-*c* has acquired the PSS and SSS.

At 405, the base station 105-*c* may send, and the UE 115-*c* may receive, a downlink signal. In some cases, the downlink signal may be a reference signal, such as a CRS. At 410, the UE 115-*c* may measure the signal strength of the downlink signal to determine the path loss associated with the base station 105-*c* and the UE 115-*c*. At 415, the UE 115-*c* may estimate the CE level based on the path loss. For example, the UE 115-*c* may estimate the CE level to be CE 1. At 420, the base station 105-*c* may transmit, and the UE 115-*c* may receive, a broadcast signal. Proceeding to 425, the UE 115-*b* may monitor the broadcast signal. For example, the UE 115-*b* may test-decode the broadcast signal once it has reached a gain consistent with the estimated CE level. At 430, if the test-decoding is successful, the UE 115-*c* may verify the estimated CE level. Accordingly, at 435, the UE 115-*c* may select resources according to the verified CE level. At 440, the UE 115-*c* may transmit, and the base station 105-*c* may receive, a RACH preamble conveyed by the selected random access resources.

If the test-decoding at 425 is unsuccessful, the UE 115-*c* may elect to return to 405. That is, the UE 115-*c* may receive another broadcast signal and measure the signal strength. In some scenarios, the UE 115-*c* may determine how many more measurements should be taken in order to determine the correct CE level. The UE 115-*c* may determine the number of measurements based on the monitoring at 425. After making the measurements, the UE 115-c may proceed to 415-430. Once the appropriate CE level has been verified (e.g., at 430), the UE 115-c may proceed to 435 and 440.

In some cases, if the test-decoding at 425 fails, the UE 115-c may monitor the signal such as described with reference to FIG. 3. For example, instead of repeating 405-415, the UE 115-c may iteratively test-decode the broadcast signal with increased CE levels until a successful decoding is achieved. Thus, the UE 115-c may utilize the estimated CE level as an initial CE level for the recursive test-decoding process described with reference to FIG. 3.

Figure 5:
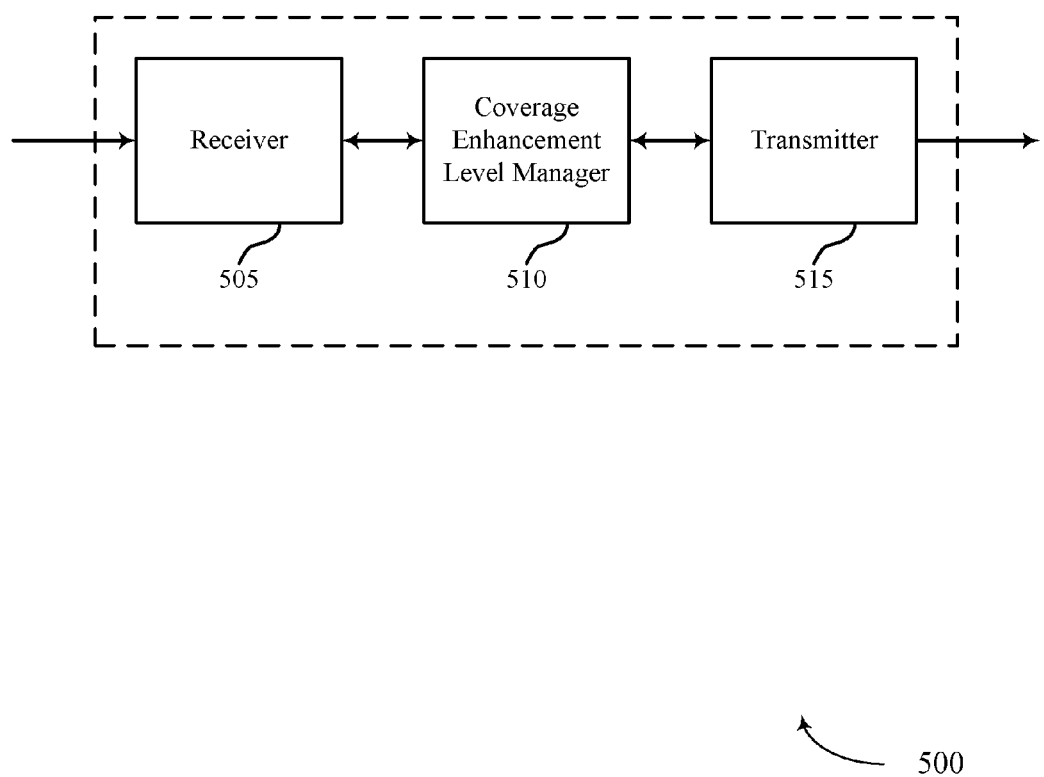
FIG. 5 shows a block diagram of a wireless device that supports CE level determination in accordance with various aspects of the present disclosure.

FIG. 5 shows a block diagram of a wireless device 500 that supports CE level determination in accordance with various aspects of the present disclosure. Wireless device 500 may be an example of aspects of a UE 115 described with reference to FIGS. 1-4. In some cases, wireless device 500 is an MTC device. Wireless device 500 may include a receiver 505, a coverage enhancement level manager 510, or a transmitter 515. Wireless device 500 may also include a processor. Each of these components may be in communication with one another.

The receiver 505 may receive information such as packets, user data, or control information associated with various information channels (e.g., control channels, data channels, and information related to CE level determination, etc.). In some cases, the information received by receiver 505 may be conveyed by downlink signals (e.g., CRS) or broadcast signals (e.g., PBCH). Information or signals may be passed on to the coverage enhancement level manager 510, and to other components of wireless device 500. For example, the receiver 505 may relay some or all of the received broadcast signals to other components of device 500. In certain aspects, redundant versions of a received signals (e.g., repetitions of a MIB) may be passed to a buffer for future use.

The coverage enhancement level manager 510 may receive a broadcast signal (e.g., from received 505) and determine whether at least a portion of the broadcast signal was successfully decoded using a first CE level. The coverage enhancement level manager 510 may communicate (e.g., via collaboration with the transmitter 515) according to the first CE level or a second CE level based on whether the broadcast signal was successfully decoded using the first CE level.

The transmitter 515 may transmit signals received from other components of wireless device 500. For example, the transmitter 515 may transmit random access messages (e.g., RACH preambles). In some cases, the transmitter may collaborate with other components of wireless device 500 to transmit signals and information. Additionally or alternatively, a component of wireless device 500 may facilitate transmissions by transmitter 515. In some examples, the transmitter 515 may be collocated with the receiver 505 in a transceiver module. The transmitter 515 may include a single antenna, or it may include a plurality of antennas.

Figure 6:
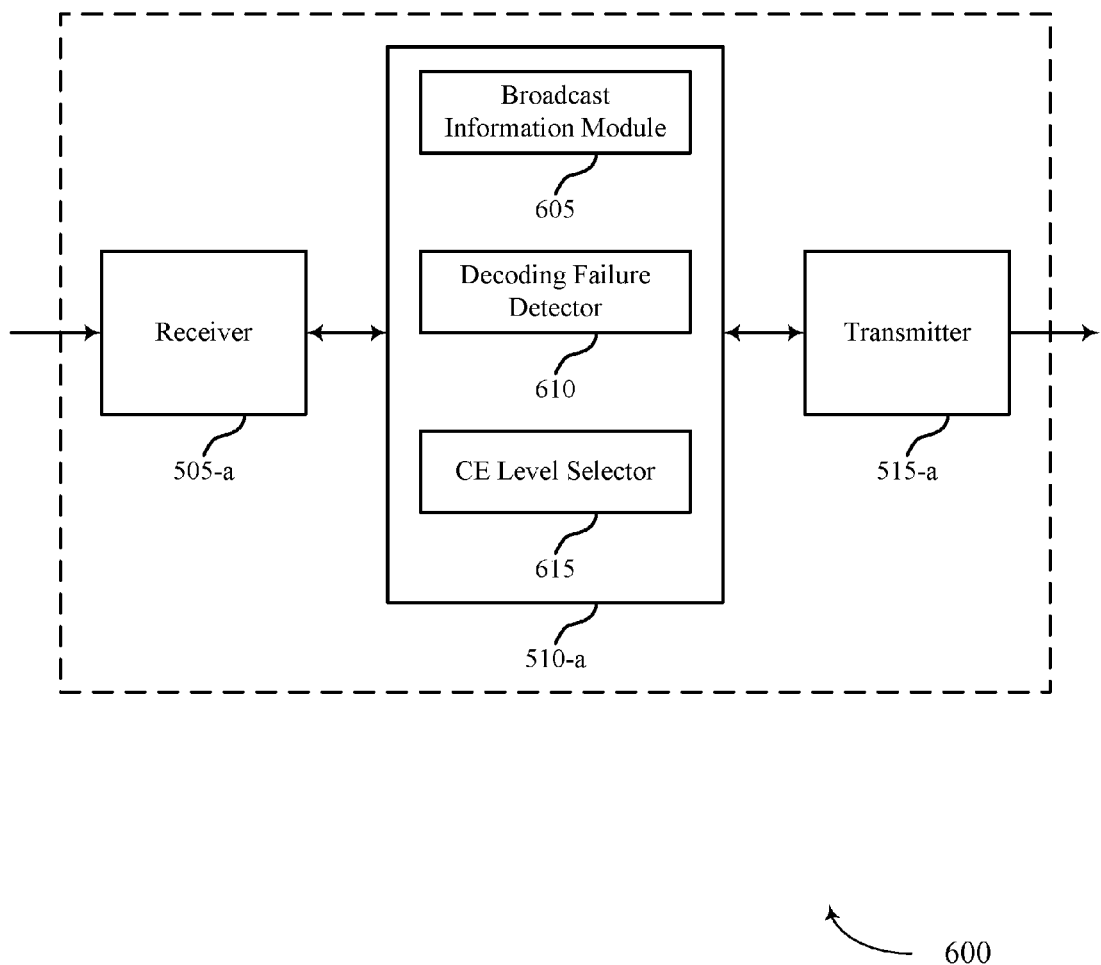
FIG. 6 shows a block diagram of a wireless device that supports CE level determination in accordance with various aspects of the present disclosure.

FIG. 6 shows a block diagram of a wireless device 600 that supports CE level determination in accordance with various aspects of the present disclosure. Wireless device 600 may be an example of aspects of a wireless device 500 or a UE 115 described with reference to FIGS. 1-5. In some cases, the wireless device 600 is an MTC device. Wireless device 600 may include a receiver 505-a, a coverage enhancement level manager 510-a, or a transmitter 515-a. Wireless device 600 may also include a processor. Each of these components may be in communication with one another. The coverage enhancement level manager 510-a may also include a broadcast information module 605, a decoding failure detector 610, and a CE level selector 615.

The receiver 505-a may receive information and signals which may be passed on to coverage enhancement level manager 510-a, and to other components of wireless device 600. The coverage enhancement level manager 510-a may perform the operations described with reference to FIG. 5. The transmitter 515-a may transmit signals received from other components of wireless device 600.

The broadcast information module 605 may receive a broadcast signal as described with reference to FIGS. 2-4. For example, the broadcast information module 605 may receive a broadcast signal from the receiver 505-a. In some cases, the broadcast signal may be a redundant version of the broadcast signal. The broadcast information module 605 may also receive a subsequent broadcast signal, which may be a new or redundant version of the broadcast signal. In some examples, the broadcast signal is a PBCH.

The decoding failure detector 610 may determine whether some portion of the broadcast signal was successfully decoded using a first CE level as described with reference to FIGS. 2-4. For example, the decoding failure detector may monitor a test-decoding of the broadcast signal. In some cases, the decoding failure detector 610 may determine that the broadcast signal was successfully decoded using the first CE level. In other cases, the decoding failure detector 610 may determine that the broadcast signal was unsuccessfully decoded using the first CE level. Thus, the decoding failure detector 610 may determine the result of a test-decoding. In some cases, decoding failure detector 610 may communicate with other components of wireless device 600 such that the communication according to the first or second CE level may be based on whether a broadcast signal is successfully decoded using the first CE level.

In one example, decoding failure detector 610 may communicate with the CE level selector 615. Accordingly, the CE level detector may select a CE level as the operating CE level of the wireless device 600 based on the result of the decoding attempt (e.g., whether the broadcast signal was successfully decoded). For example, if the decoding failure detector 610 determines that the broadcast signal was successfully decoded using the first CE level, the CE level selector 615 may select the first CE level as the operating CE level of wireless device 600. On the other hand, if the decoding failure detector 610 determines that the broadcast signal was unsuccessfully decoded using the first CE level, the CE level selector 615 may select the second CE level as the operating CE level of wireless device 600. Once the operating CE level is selected, the CE level selector may facilitate communications according to the selected level (e.g., the first CE level or the second CE level). Thus, communication at the selected CE level may be based on whether the broadcast signal was successfully decoded using the first CE level as described with reference to FIGS. 2-4.

In certain scenarios, the CE level selector 615 may declare the selected CE level as the operating CE level of the wireless device 600. For example, the CE level selector 615 may declare the first CE level as the operating CE level. In some cases, the CE level selector 615 may select the first CE level based on the measured path loss. The measured path loss may be communicated to the CE level selector 615 from a different component of wireless device 600. In some examples, the first and second CE levels are selected from a set of CE levels and each CE level corresponds to a different CE value.

Figure 7:
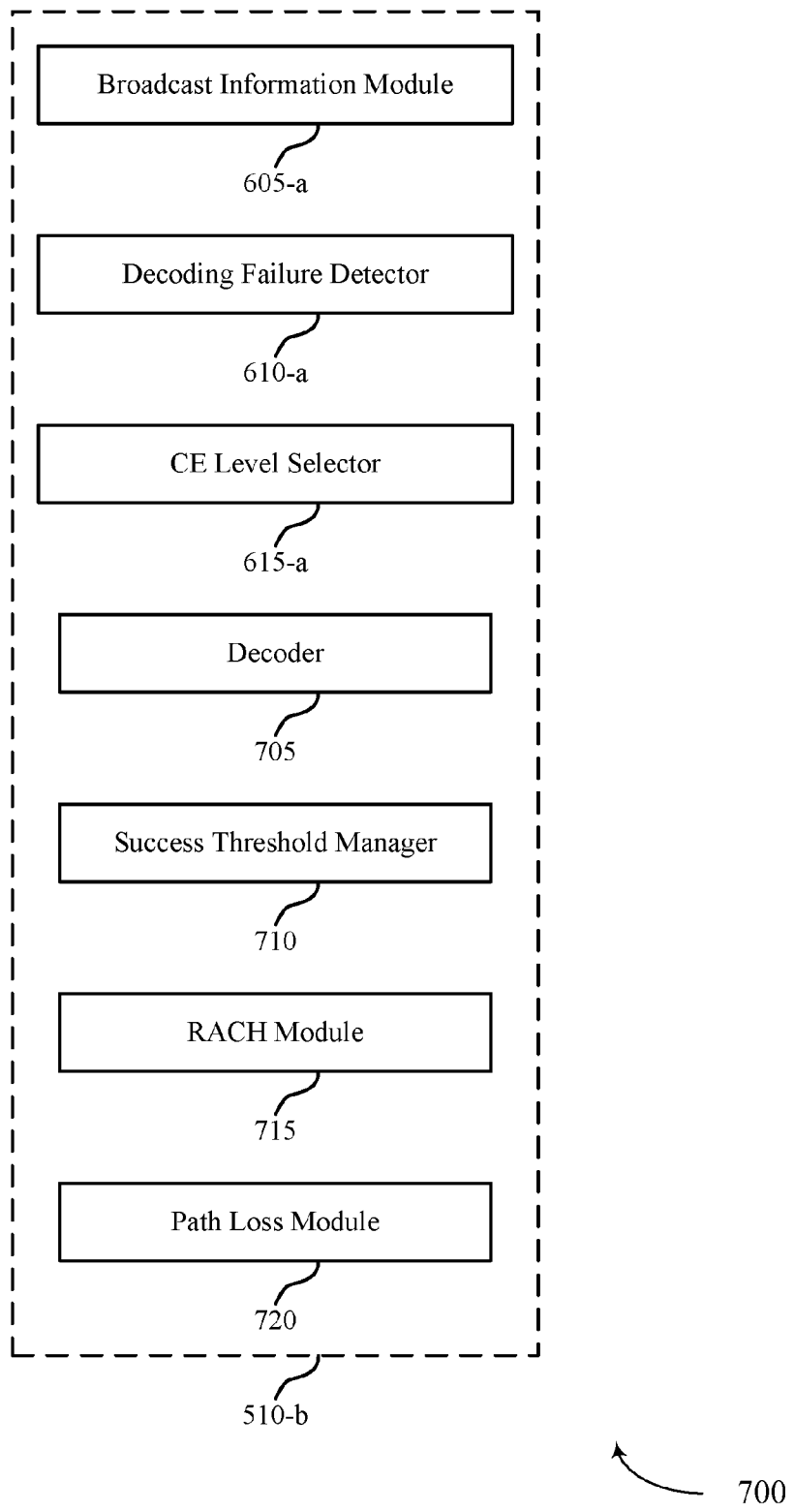
FIG. 7 shows a block diagram of a wireless device that supports CE level determination in accordance with various aspects of the present disclosure.

FIG. 7 shows a block diagram 700 of a coverage enhancement level manager 510-b which may be a component of a wireless device 500 or a wireless device 600 that supports CE level determination in accordance with various aspects of the present disclosure. The coverage enhancement level manager 510-*b* may be an example of aspects of a coverage enhancement level manager 510 described with reference to FIGS. 5-6. The coverage enhancement level manager 510-*b* may include a broadcast information module 605-*a*, a decoding failure detector 610-*a*, and a CE level selector 615-*a*. Each of these modules may perform the functions described with reference to FIG. 6. The coverage enhancement level manager 510-*b* may also include a decoder 705, a success threshold manager 710, a random access channel (RACH) module 715, and a path loss module 720.

The decoder 705 may decode signals, such as the broadcast signals, received at the receiver 505-*a*. In some cases, the decoder 705 may test-decode a portion of a broadcast signal using the first CE level. The decoding failure detector 610 may monitor the decoding attempt or communicate with the decoder 705 to determine the success of the decoding attempt. Thus, determining whether a portion of the broadcast signal was successfully decoded using a first CE level may include test-decoding the portion of the broadcast signal using the first CE level. In some cases (e.g., when the test-decoding using the first CE level is unsuccessful), the decoder 705 may decode a portion of a broadcast signal using the second CE level. The second CE level may be a greater CE than the first CE level. In certain examples, the broadcast signal received by the receiver 505-*a* may be transmitted according to a CE level that is different from the first and second CE levels. For example, the third CE level may be a greater CE level than the first or second CE levels.

The decoder 705 or decoding failure detector 610-*a* may be in communication with the success threshold manager 710. For example, the success threshold manager 710 may be passed information from the decoder 705 or decoding failure detector 610-*a* indicating when a decoding attempt is successful. The success threshold manager 710 may log or monitor the number of successful test-decoding attempts for a particular CE level. For example, the success threshold manager 710 may determine the number of broadcast signals that are successfully decoded using the first CE level. In some cases, the success threshold manager 710 may determine that the number of broadcast signals successfully decoded using the first CE level exceeds a threshold as described with reference to FIGS. 2-4. For example, the success threshold manager 710 may compare the number of successful decoding attempts to a threshold number. If the number of successful decoding attempts exceeds the threshold number, the CE level selector may declare the corresponding CE level (e.g., the first CE level) as the operating CE level of the wireless device 600.

The RACH module 715 may be responsible for random access communications. For example, the RACH module 715 may be configured such that communicating according to the first CE level or the second CE level may include transmitting a RACH message (e.g., a RACH preamble) on resources associated with the first CE level or the second CE level as described with reference to FIGS. 2-4.

The path loss module 720 may measure a downlink signal path loss based on a RSRP as described with reference to FIGS. 2-4. For example, the path loss module 720 may measure the RSRP of a broadcast signal (e.g., a broadcast signal received from the broadcast information module 605-*a*) and determine the path loss associated with that broadcast signal. In some cases, the path loss module 720 may communicate the path loss to the CE level selector 615-*a*. In such an instance, the CE level selector 615-*a* may select the first CE level based on the path loss information.

Figure 8:
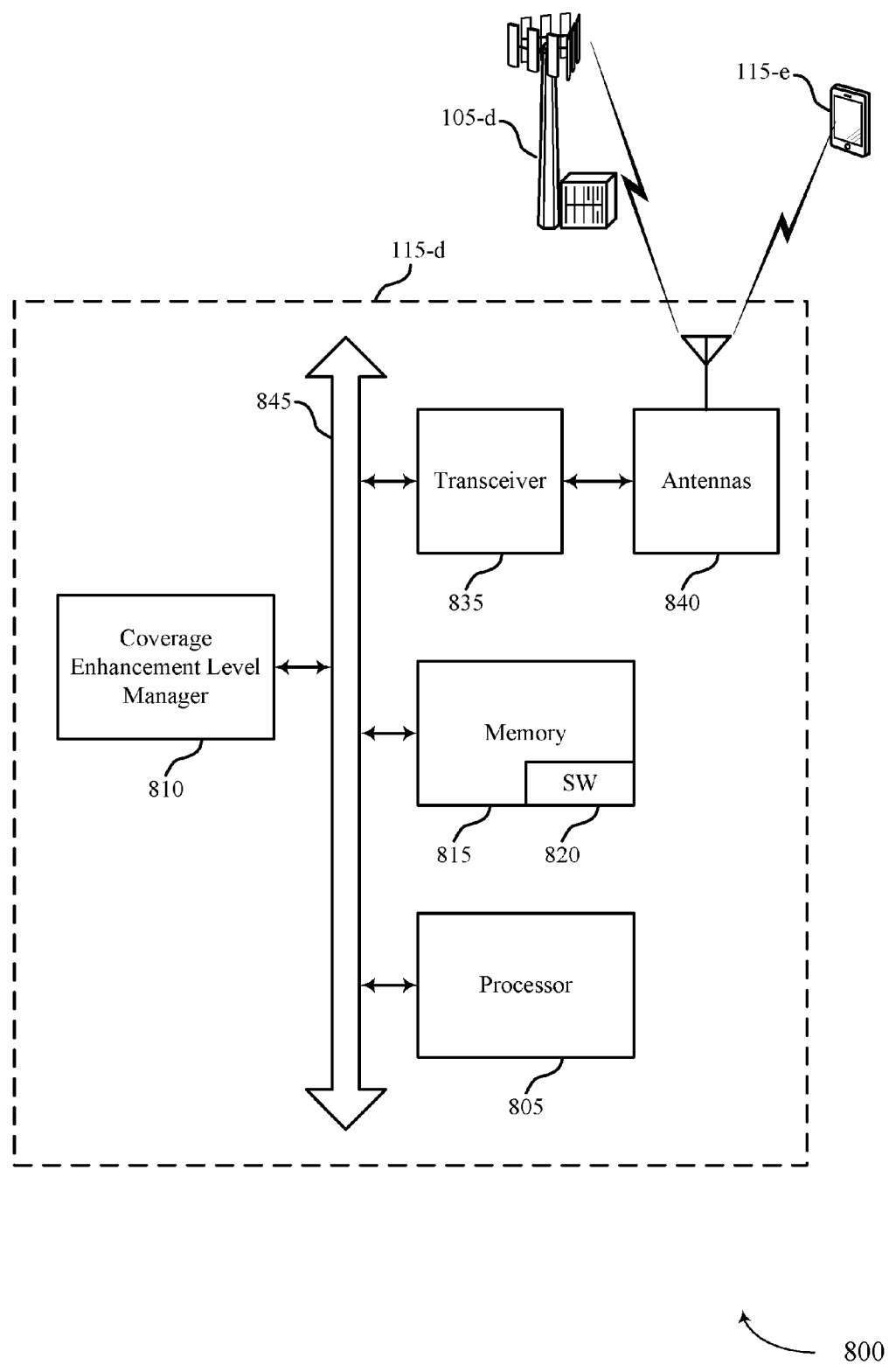
FIG. 8 illustrates a block diagram of a system, including a user equipment (UE), that supports CE level determination in accordance with various aspects of the present disclosure.

FIG. 8 shows a diagram of a system 800, including a UE 115-*d*, that supports CE level determination in accordance with various aspects of the present disclosure. UE 115-*a* may be an example of a wireless device 500, a wireless device 600, or a UE 115 described with reference to FIGS. 1, 2 and 5-7. UE 115-*d* may include a coverage enhancement level manager 810, which may be an example of a coverage enhancement level manager 510 described with reference to FIGS. 5-7. UE 115-*d* may also include components for bi-directional voice and data communications including components for transmitting communications and components for receiving communications. For example, UE 115-*d* may communicate bi-directionally with base station 105-*d* or UE 115-*e*.

UE 115-*d* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., CE level determination, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

The components of wireless device 500, wireless device 600, coverage enhancement level manager 510-*b*, and coverage enhancement level manager 810 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
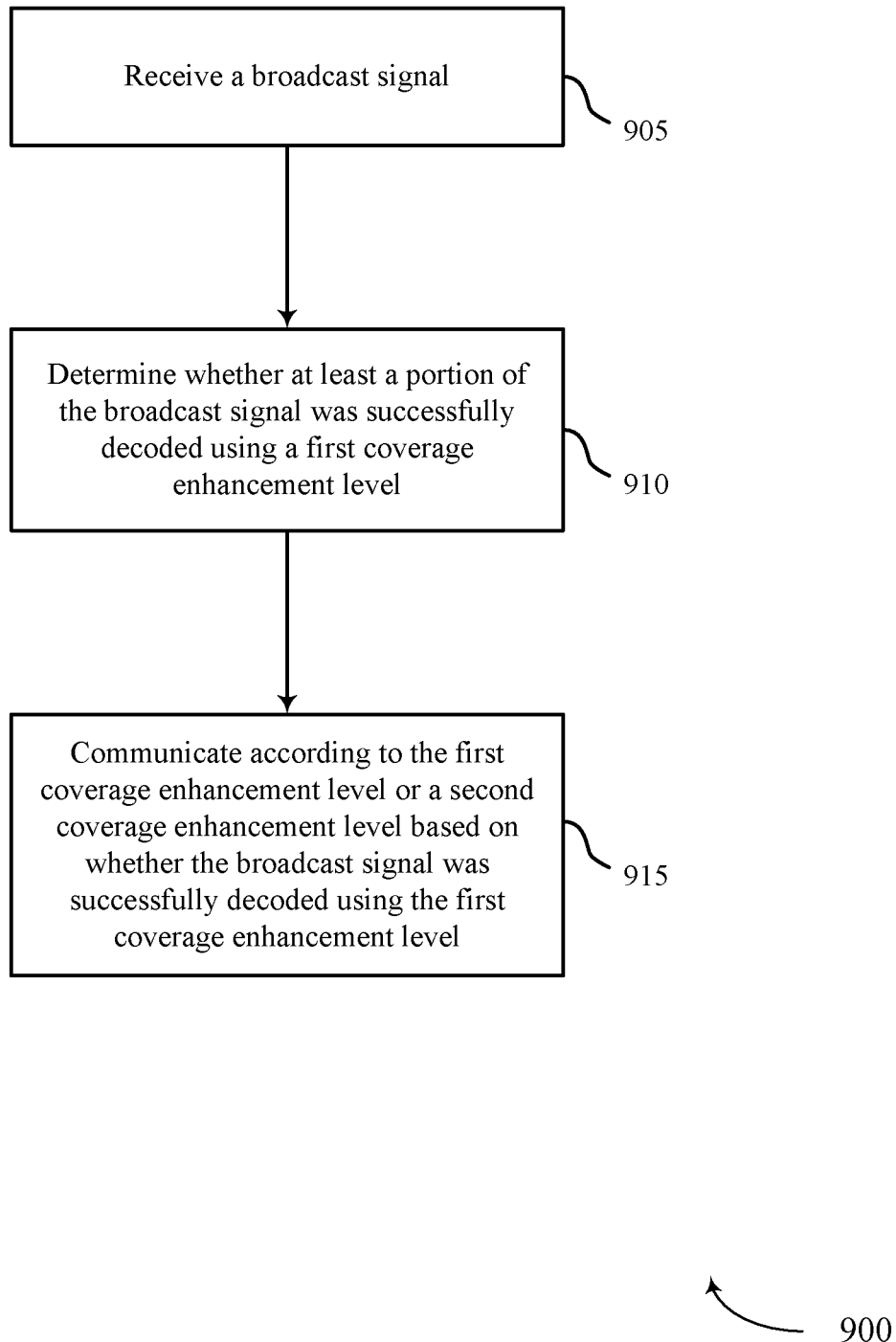
FIG. 9 illustrates a method for coverage CE level determination in accordance with various aspects of the present disclosure.

FIG. 9 shows a flowchart illustrating a method 900 for CE level determination in accordance with various aspects of the present disclosure. The operations of method 900 may be implemented by a UE 115 or its components as described with reference to FIGS. 1-8. For example, the operations of method 900 may be performed by the coverage enhancement level manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware.

At block 905, the UE 115 may receive a broadcast signal as described with reference to FIGS. 2-4. The broadcast signal may be transmitted at the highest CE level. In certain examples, the operations of block 905 may be performed by the broadcast information module 605 as described with reference to FIG. 6. In some cases, the UE 115 may attempt to decode all or a portion of the broadcast signal. For example, the UE 115 may test-decode a portion of the broadcast signal using a test CE level. The decoding attempt may be performed according to a CE level that is less than the transmitted CE level (e.g., a first CE level, such as CE 0). At block 910, the UE 115 may determine whether at least a portion of the broadcast signal was successfully decoded using a first CE level as described with reference to FIGS. 2-4. In certain examples, the operations of block 910 may be performed by the decoding failure detector 610 as described with reference to FIG. 6.

Proceeding to block 915, the UE 115 may communicate according to the first CE level or a second CE level based at least in part on whether the broadcast signal was successfully decoded using the first CE level as described with reference to FIGS. 2-4. In some cases, the first and second CE levels provide less CEs than the CE level with which the broadcast signal was transmitted. In certain examples, the operations of block 915 may be performed or facilitated by the CE level selector 615 as described with reference to FIG. 6. In one example, the UE 115 may communicate according to the selected CE level by transmitting a RACH message, such as a RACH preamble. The RACH message may be transmitted on resources that are selected based at least in part on the chosen CE level.

Figure 10:
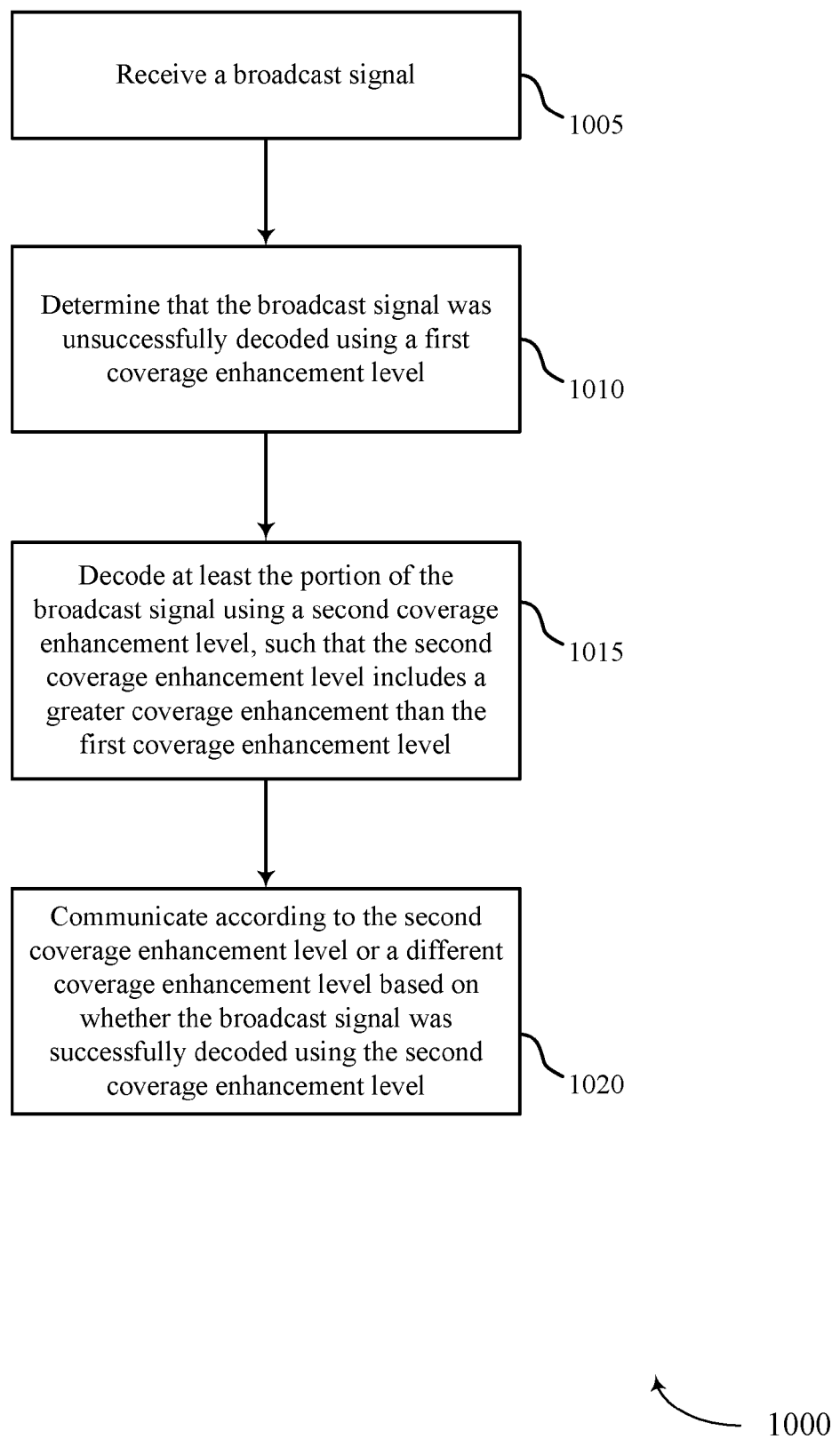
FIG. 10 illustrates a method for CE level determination in accordance with various aspects of the present disclosure.

FIG. 10 shows a flowchart illustrating a method 1000 for CE level determination in accordance with various aspects of the present disclosure. The operations of method 1000 may be implemented by a UE 115 or its components as described with reference to FIGS. 1-8. For example, the operations of method 1000 may be performed by the coverage enhancement level manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1000 may also incorporate aspects of method 900 of FIG. 9.

At block 1005, the UE 115 may receive a broadcast signal as described with reference to FIGS. 2-4. In certain examples, the operations of block 1005 may be performed by the broadcast information module 605 as described with reference to FIG. 6. In some cases, the UE 115 may attempt to decode the broadcast signal according to a first CE level. At block 1010, the UE 115 may determine that the broadcast signal was unsuccessfully decoded using the first CE level as described with reference to FIGS. 2-4. In certain examples, the operations of block 1010 may be performed by the decoding failure detector 610 as described with reference to FIG. 6.

At block 1015, the UE 115 may decode at least the portion of the broadcast signal using a second CE level as described with reference to FIGS. 2-4. The second CE level may provide a greater CE than the first CE level. In certain examples, the operations of block 1015 may be performed by the decoder 705 as described with reference to FIG. 7.

At block 1020, the UE 115 may communicate according to the second coverage level as described with reference to FIGS. 2-4. The communication may be based at least in part on the unsuccessful decoding attempt using the first CE level or the successful decoding attempt using the second CE level. In certain examples, the operations of block 1015 may be performed or facilitated by the CE level selector 615 as described with reference to FIG. 6.

Figure 11:
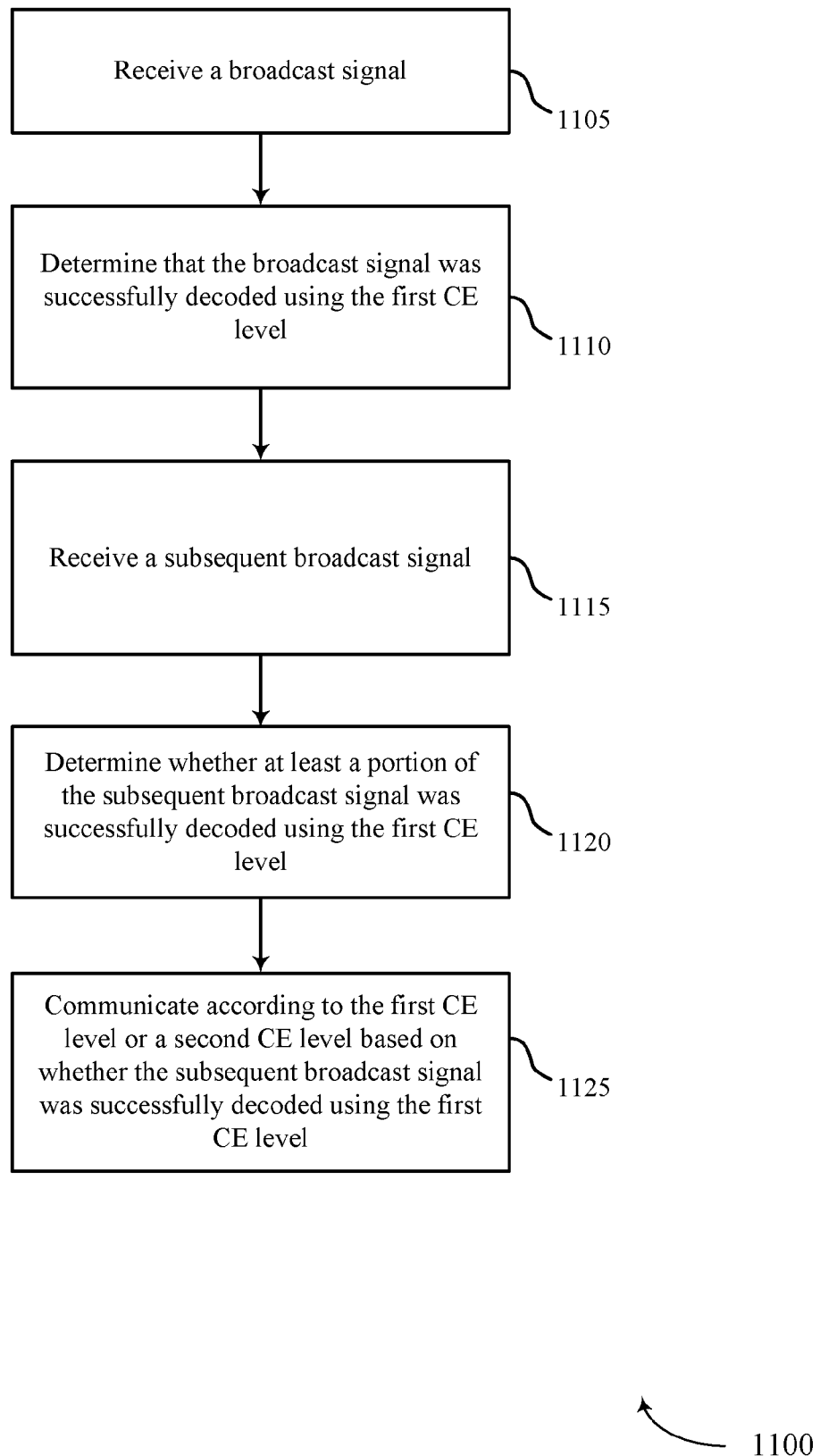
FIG. 11 illustrates a method for CE level determination in accordance with various aspects of the present disclosure.

FIG. 11 shows a flowchart illustrating a method 1100 for CE level determination in accordance with various aspects of the present disclosure. The operations of method 1100 may be implemented by a UE 115 or its components as described with reference to FIGS. 1-8. For example, the operations of method 1100 may be performed by the coverage enhancement level manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1100 may also incorporate aspects of methods 900, and 1000 of FIGS. 9-10.

At block 1105, the UE 115 may receive a broadcast signal as described with reference to FIGS. 2-4. In certain examples, the operations of block 1105 may be performed by the broadcast information module 605 as described with reference to FIG. 6.

At block 1110, the UE 115 may determine that the broadcast signal was successfully decoded using the first CE level as described with reference to FIGS. 2-4. In certain examples, the operations of block 1110 may be performed by the decoding failure detector 610 as described with reference to FIG. 6.

At block 1115, the UE 115 may receive a subsequent broadcast signal as described with reference to FIGS. 2-4. In certain examples, the operations of block 1115 may be performed by the broadcast information module 605 as described with reference to FIG. 6.

At block 1120, the UE 115 may determine whether at least a portion of the subsequent broadcast signal was successfully decoded using the first CE level as described with reference to FIGS. 2-4. In certain examples, the operations of block 1120 may be performed by the decoding failure detector 610 as described with reference to FIG. 6.

At block 1125, the UE 115 may communicate according to the first CE level or a second CE level based at least in part on whether the subsequent broadcast signal was successfully decoded using the first CE level as described with reference to FIGS. 2-4. In certain examples, the operations of block 1125 may be performed or facilitated by the CE level selector 615 as described with reference to FIG. 6.

Figure 12:
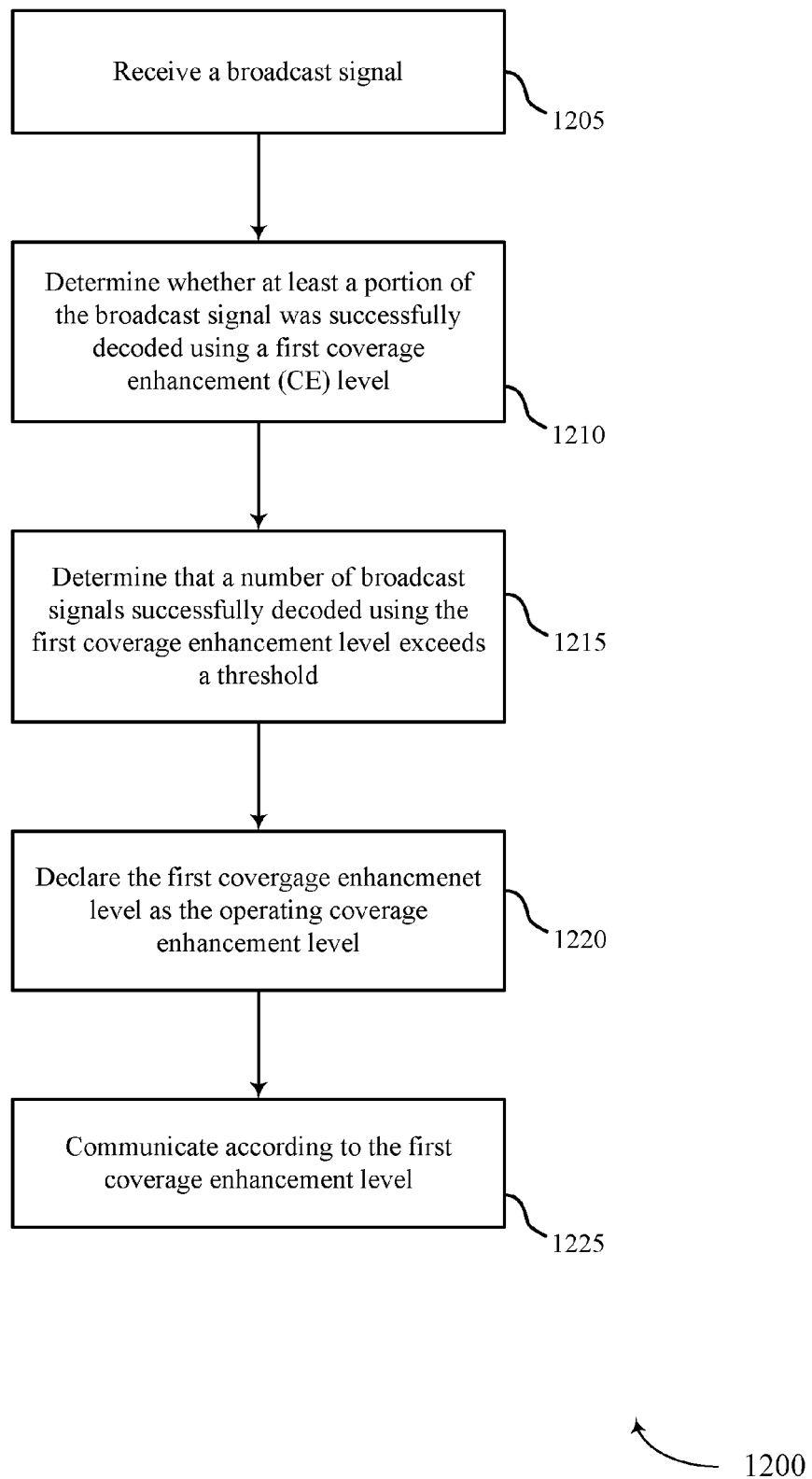
FIG. 12 illustrates a method for CE level determination in accordance with various aspects of the present disclosure.

FIG. 12 shows a flowchart illustrating a method 1200 for CE level determination in accordance with various aspects of the present disclosure. The operations of method 1200 may be implemented by a UE 115 or its components as described with reference to FIGS. 1-8. For example, the operations of method 1200 may be performed by the coverage enhancement level manager 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware. The method 1200 may also incorporate aspects of methods 900, 1000, and 1100 of FIGS. 9-11.

At block 1205, the UE 115 may receive a broadcast signal as described with reference to FIGS. 2-4. In certain examples, the operations of block 1205 may be performed by the broadcast information module 605 as described with reference to FIG. 6. At block 1210, the UE 115 may determine whether at least a portion of the broadcast signal was successfully decoded using a first CE level as described with reference to FIGS. 2-4. In certain examples, the operations of block 1210 may be performed by the decoding failure detector 610 as described with reference to FIG. 6.

At block 1215, the UE 115 may determine that a number of broadcast signals successfully decoded using the first CE level exceeds a threshold as described with reference to FIGS. 2-4. In certain examples, the operations of block 1215 may be performed by the success threshold manager 710 as described with reference to FIG. 7.

At block 1220, the UE 115 may declare the first CE level as the operating CE level of the UE 115 as described with reference to FIGS. 2-4. For example, the UE 115 may indicate the operating CE level to an associated base station. The indication may be explicit (e.g., indicated by a message) or implicit (e.g., indicated by the resources used to communicate). In certain examples, the operations of block 1220 may be performed by the CE level selector 615 as described with reference to FIG. 6.

At block 1225, the UE 115 may communicate according to the first CE level as described with reference to FIGS. 2-4. The communication may be based at least in part on the satisfaction of the success threshold. In certain examples, the operations of block 1225 may be performed or facilitated by the CE level selector 615 as described with reference to FIG. 6.

Thus, methods 900, 1000, 1100, and 1200 may provide for CE level determination. It should be noted that methods 900, 1000, 1100, and 1200 describe possible implementation, and that the operations and the steps may be rearranged or otherwise modified such that other implementations are possible. In some examples, aspects from two or more of the methods 900, 1000, 1100, and 1200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X , 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

The wireless communications system or systems (e.g., systems 100 and 200) described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   receiving a first broadcast signal;
   determining whether at least a portion of the first broadcast signal was successfully decoded using a first coverage enhancement (CE) level;
   receiving one or more subsequent broadcast signals;
   determining whether at least portions of the one or more subsequent broadcast signals were successfully decoded using the first CE level; and
   communicating according to the first CE level or a second CE level based at least in part on whether the at least portions of the first broadcast signal and the one or more subsequent broadcast signals were successfully decoded using the first CE level.

2. The method of claim 1, further comprising:
   determining that the first broadcast signal was unsuccessfully decoded using the first CE level; and
   decoding at least the portion of the first broadcast signal using the second CE level, wherein the second CE level comprises a greater coverage enhancement than the first CE level, and wherein the communication is according to the second CE level.

3. The method of claim 1, further comprising:
   determining that a number of broadcast signals successfully decoded using the first CE level exceeds a threshold; and
   declaring the first CE level as an operating CE level, wherein the communication is according to the first CE level.

4. The method of claim 1, wherein communicating according to the first CE level or the second CE level comprises:
   transmitting a random access channel (RACH) message on resources associated with the first CE level or the second CE level.

5. The method of claim 1, wherein determining whether at least a portion of the first broadcast signal was successfully decoded using a first CE level comprises:
   test-decoding the portion of the first broadcast signal using the first CE level.

6. The method of claim 1, further comprising:
   measuring a downlink signal path loss based at least in part on a reference signal received power (RSRP); and
   selecting the first CE level based at least in part on the measured path loss.

7. The method of claim 6, further comprising:
   determining that the first broadcast signal was unsuccessfully decoded using the first CE level; and
   selecting the second CE level based at least in part on the determination that the first broadcast signal was unsuccessfully decoded.

8. The method of claim 1, wherein the first broadcast signal comprises a physical broadcast channel (PBCH).

9. The method of claim 1, wherein the first and second CE levels are selected from a set of CE levels, and wherein each CE level of the set corresponds to a different coverage enhancement value.

10. The method of claim 1, wherein the first broadcast signal is transmitted according to a third CE level, and wherein the first CE level comprises a lesser coverage enhancement than the third CE level.

11. An apparatus for wireless communication, comprising:
    means for receiving a first broadcast signal;

means for determining whether at least a portion of the first broadcast signal was successfully decoded using a first coverage enhancement (CE) level;
means for receiving one or more subsequent broadcast signals;
means for determining whether at least portions of the one or more subsequent broadcast signals were successfully decoded using the first CE level; and
means for communicating according to the first CE level or a second CE level based at least in part on whether the at least portions of the first broadcast signal and the one or more subsequent broadcast signals were successfully decoded using the first CE level.

12. The apparatus of claim 11, further comprising:
means for determining that the first broadcast signal was unsuccessfully decoded using the first CE level; and
means for decoding at least the portion of the first broadcast signal using the second CE level, wherein the second CE level comprises a greater coverage enhancement than the first CE level, and wherein the means for communicating is operable to communicate according to the second CE level.

13. An apparatus for wireless communication, comprising:
a processor;
memory in electronic communication with the processor; and
instructions stored in the memory and operable, when executed by the processor, to cause the apparatus to:
receive a first broadcast signal;
determine whether at least a portion of the first broadcast signal was successfully decoded using a first coverage enhancement (CE) level;
receive one or more subsequent broadcast signals;
determine whether at least portions of the one or more subsequent broadcast signals were successfully decoded using the first CE level; and
communicate according to the first CE level or a second CE level based at least in part on whether the at least portions of the first broadcast signal and the one or more subsequent broadcast signals were successfully decoded using the first CE level.

14. The apparatus of claim 13, wherein the instructions are operable to cause the apparatus to:
determine that the first broadcast signal was unsuccessfully decoded using the first CE level; and
decode at least the portion of the first broadcast signal using the second CE level, wherein the second CE level comprises a greater coverage enhancement than the first CE level, and wherein the communication is according to the second CE level.

15. The apparatus of claim 13, wherein the instructions are operable to cause the apparatus to:
determine that a number of broadcast signals successfully decoded using the first CE level exceeds a threshold; and
declare the first CE level as an operating CE level, wherein the communication is according to the first CE level.

16. The apparatus of claim 13, wherein the instructions are operable to cause the apparatus to:
transmit a random access channel (RACH) message on resources associated with the first CE level or the second CE level.

17. The apparatus of claim 13, wherein the instructions are operable to cause the apparatus to:
test-decode the portion of the first broadcast signal using the first CE level.

18. The apparatus of claim 13, wherein the instructions are operable to cause the apparatus to:
measure a downlink signal path loss based at least in part on a reference signal received power (RSRP); and
select the first CE level based at least in part on the measured path loss.

19. The apparatus of claim 18, wherein the instructions are operable to cause the apparatus to:
determine that the first broadcast signal was unsuccessfully decoded using the first CE level; and
select the second CE level based at least in part on the determination that the first broadcast signal was unsuccessfully decoded.

20. A non-transitory computer-readable medium storing code for wireless communication, the code comprising instructions executable to:
receive a first broadcast signal;
determine whether at least a portion of the first broadcast signal was successfully decoded using a first coverage enhancement (CE) level;
receive one or more subsequent broadcast signals;
determine whether at least portions of the one or more subsequent broadcast signals were successfully decoded using the first CE level; and
communicate according to the first CE level or a second CE level based at least in part on whether the at least portions of the first broadcast signal and the one or more subsequent broadcast signals were successfully decoded using the first CE level.

21. The non-transitory computer-readable medium of claim 20, wherein the instructions are executable to:
determine that the first broadcast signal was unsuccessfully decoded using the first CE level; and
decode at least the portion of the first broadcast signal using the second CE level, wherein the second CE level comprises a greater coverage enhancement than the first CE level, and wherein the communication is according to the second CE level.

22. The non-transitory computer-readable medium of claim 20, wherein the instructions are executable to:
determine that a number of broadcast signals successfully decoded using the first CE level exceeds a threshold; and
declare the first CE level as an operating CE level, wherein the communication is according to the first CE level.

23. The non-transitory computer-readable medium of claim 20, wherein the instructions are executable to:
transmit a random access channel (RACH) message on resources associated with the first CE level or the second CE level.

24. The non-transitory computer-readable medium of claim 20, wherein the instructions are executable to:
test-decode the portion of the first broadcast signal using the first CE level.

25. The non-transitory computer-readable medium of claim 20, wherein the instructions are executable to:
measure a downlink signal path loss based at least in part on a reference signal received power (RSRP); and
select the first CE level based at least in part on the measured path loss.

26. The non-transitory computer-readable medium of claim 25, wherein the instructions are executable to:
determine that the first broadcast signal was unsuccessfully decoded using the first CE level; and select the second CE level based at least in part on the determination that the first broadcast signal was unsuccessfully decoded.

\* \* \* \* \*